United States Patent
Bhattacharya et al.

(10) Patent No.: US 11,716,259 B2
(45) Date of Patent: Aug. 1, 2023

(54) ON-DEMAND INSTANCE

(71) Applicant: SAP SE, Walldorf (DE)

(72) Inventors: Siddhartha Bhattacharya, Chester Springs, PA (US); Amanda Hope Bailey, Upper Makefield, PA (US); Jon Fullerton, San Francisco, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/536,978

(22) Filed: Nov. 29, 2021

(65) Prior Publication Data

US 2023/0171167 A1 Jun. 1, 2023

(51) Int. Cl.
*H04L 41/5051* (2022.01)
*H04L 41/50* (2022.01)
*H04L 41/5054* (2022.01)
*H04L 41/5041* (2022.01)

(52) U.S. Cl.
CPC ...... *H04L 41/5051* (2013.01); *H04L 41/5048* (2013.01); *H04L 41/5054* (2013.01); *H04L 41/5058* (2013.01)

(58) Field of Classification Search
None
See application file for complete search history.

(56) References Cited

U.S. PATENT DOCUMENTS

| | | | | |
|---|---|---|---|---|
| 6,363,411 B1* | 3/2002 | Dugan | ............ | H04M 15/90 709/202 |
| 6,779,030 B1* | 8/2004 | Dugan | ............ | H04Q 3/0037 379/221.08 |
| 7,721,266 B2* | 5/2010 | Frey | ............ | G06F 11/366 717/128 |
| 7,788,319 B2* | 8/2010 | Schmidt | ............ | G06F 9/5038 709/200 |
| 8,429,630 B2* | 4/2013 | Nickolov | ............ | H04L 67/10 717/148 |
| 9,038,023 B2* | 5/2015 | Zenz | ............ | G06F 9/44505 717/121 |
| 10,877,774 B2* | 12/2020 | Xue | ............ | G06F 9/44505 |
| 11,057,282 B2* | 7/2021 | Bhatia | ............ | H04L 63/101 |
| 2007/0162892 A1* | 7/2007 | Zenz | ............ | G06F 9/44505 717/121 |

(Continued)

*Primary Examiner* — Ranodhi Serrao
(74) *Attorney, Agent, or Firm* — Mintz Levin Cohn Ferris Glovsky and Popeo, P.C.

(57) ABSTRACT

A method, a system, and a computer program product for generating and/or configuring a computing instance. A request to configure a computing instance for integration with at least one first computing system is received. At least one first computing component associated with the first computing system required for integration of the configured computing instance with the first computing system is identified. At least one second computing component for inclusion into the computing instance is identified. The second computing component is not required for integration of the configured computing instance with the first computing system. A configuration of the computing instance is generated using the identified first and second computing components. The configuration of the computing instance is applied in the first computing system. The configuration of the computing instance is executed by the first computing system and stored.

20 Claims, 9 Drawing Sheets

(56) References Cited

U.S. PATENT DOCUMENTS

2009/0276771 A1* 11/2009 Nickolov ............ H04L 67/1008
  718/1
2018/0173594 A1* 6/2018 Rosier ..................... G06F 16/27
2020/0396140 A1* 12/2020 Bhatia ................... H04L 63/101

* cited by examiner

FIG. 4.

RETAIL INDUSTRY TEMPLATE — 400

401 — Core (402 Type / 405 What's unique to Retail?)

| Area | Type | What's unique to Retail? |
|---|---|---|
| Core | Company Structure | 1110 Best Run Retail |
|  | Job Profiles | 2 job profiles for sales manager and sales associate |
|  | Main Personas | Nick Stuart Retail Manager<br>Rose Cassey HRBP<br>Ben S Store manager |
|  | Org Structure | 1110 |
|  | Localizations |  |

404 — Employee Central

| Area | Type | What's unique to Retail? |
|---|---|---|
| Employee Central | Global Assign. |  |
|  | Contingent Workers | Security guard workflow |
|  | Concurrent Employment |  |
|  | Global Benefits |  |
|  | Time Recording |  |
|  | Pay Scale |  |
|  | Progression |  |
|  | Workflows |  |

406 — Talent Acquisition / Talent Management

| Area | Type | What's unique to Retail? |
|---|---|---|
| Talent Acquisition | Recruiting | - Mass hiring scenario<br>- Evergreen requisition<br>- Store associate hiring workflow<br>- Store manager hiring workflow<br>- New hire store associate |
|  | Onboarding |  |
|  | Off-boarding |  |
|  | Cross-boarding |  |
| Talent Management | Goal Plans |  |
|  | Performance Plans |  |
|  | Development Plans |  |
|  | Mentoring |  |
|  | Succession Org Chart |  |
|  | Talent Pools |  |
|  | Talent Search |  |
|  | Performance Potential Matrix Calibration |  |
|  | Compensation |  |
|  | Presentations |  |
|  | Position Tiles |  |
|  | Rewards M |  |
|  | Recognition |  |

408 / 410

| Area | Type | What's unique to Retail? |
|---|---|---|
| Learning | Competencies | Store associate comp. |
|  | Training Requests | Store associate training |
|  | Cover Pages |  |
|  | Programs |  |
|  | Collections |  |
|  | Mobile |  |
| Reporting | Reporting and Analytics | 2 dashboards to showcase HR + Finance + XM views. |
| Integration | S4HC | Monitor revenue targets and controllable costs including labor overtime and individual store & manager impacts |
| Planning | Workforce planning | WFP for adding store managers and store associates for Chicago store location. |
| Integration | Fieldglass | Security guard FG req. |
| Partner | KRONOS/FLEXPAY | Offer shift swapping and geo fencing clock-in, and same day pay options(OPTIONAL) |
| Integration | EC Payroll Scenarios |  |
| Extensibility | MDF |  |
| Mobile | Retail App | Store Manager Self Service Functions. |

| System Type | Type | System/Module to Configure |
|---|---|---|
| Core | BizX | Yes (Default) |
| Core | LMS | Yes |
| Core | RMK | Yes |
| Core | RPOS | Yes |
| Core | ONB 2.0 | Yes |
| Partner Integration | DocuSign | Yes |

FIG. 6.

ON-DEMAND INSTANCE

TECHNICAL FIELD

This disclosure relates generally to data processing and, in particular, to generation and/or providing of on-demand instances (e.g., content, computing applications, functionalities, etc.) in computing systems.

BACKGROUND

In today's world, many companies rely on software applications to conduct their business. Software applications deal with various aspects of companies' businesses, which can include finances, product development, human resources, customer service, management, and many other aspects. Software applications typically use various forms of content, data, and/or other software applications for specific operational purposes. Such content, data, and/or other software applications may need to be configured to ensure proper operation. Thus, it is important to ensure that proper configurations of such content, data, and/or other software applications are delivered and implemented in accordance with requirements of computing systems where such content, data, and/or other software applications are to be implemented. Moreover, it is important to provide an easy way to design a computing system that is built to the specific needs, requirements, etc. of various entities.

Implementing a diverse group of interacting content, data and software applications can be difficult when both selling software solutions to customers as well as implementing that solution post-sales. In pre-sales interactions with customers, many customers want to see a demonstration, or demo version, of what the final software product will look like and operate. Trying to pull diverse resources together in a coherent demonstration can be very challenging and can lead to an incomplete demo version being shown to a potential customer.

Once a sale is completed, the integration of diverse resources can also be very challenging and time consuming in delivering the final product or service to the customer. In many cases, integration software, sometimes called glue software, is needed to put the diverse resources together into a cohesive product or service. This can take a lot of time in delivering the final product or service.

SUMMARY

In some implementations, the current subject matter relates to a computer implemented method for generating and/or configuring a computing instance. The method may include receiving a request to configure a computing instance for integration with at least one first computing system, identifying at least one first computing component associated with the first computing system required for integration of the configured computing instance with the first computing system, and identifying at least one second computing component for inclusion into the computing instance. The second computing component is not required for integration of the configured computing instance with the first computing system. The method may also include generating, using the identified first and second computing components, a configuration of the computing instance and applying the configuration of the computing instance in the first computing system, executing the configuration of the computing instance by the first computing system, and storing the configuration of the computing instance.

In some implementations, the current subject matter may include one or more of the following optional features. The computing instance may include at least one of the following: one or more software applications, one or more computing functionalities, one or more computing components, one or more computing systems, one or more contents, one or more data, one or more metadata, and any combination thereof.

In some implementations, the method may include receiving another request for configuring the computing instance for integration with at least another computing system, accessing the stored configuration of the computing instance, applying the stored configuration of the computing instance in at least another computing system, and executing the stored configuration of the computing instance by at least another computing system. This may allow reuse of stored configurations/instances.

In some implementations, the computing instance may be configured using a predetermined stored configuration template. The computing instance may be configured using at least one of the following: one or more integration parameters associated with at least one of: at least one first component and at least one second component, one or more best practices parameters associated with the at least one computing system, one or more industry parameters associated with the at least one computing system, one or more localization parameters associated with at least one computing system, and any combination thereof.

In some implementations, the configuration of the computing instance may include a configuration of at least one of: at least one first computing component, at least one second computing component, and any combination thereof. The configuration of the computing instance may include a configuration associated with a predetermined content.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 illustrates an exemplary retail industry template that may be used for generation of an on-demand instance, according to some implementations of the current subject matter;

FIG. 6 illustrates an exemplary instance configuration that may be generated by the system shown in FIG. 3, according to some implementations of the current subject matter;

DETAILED DESCRIPTION

Figure 1:
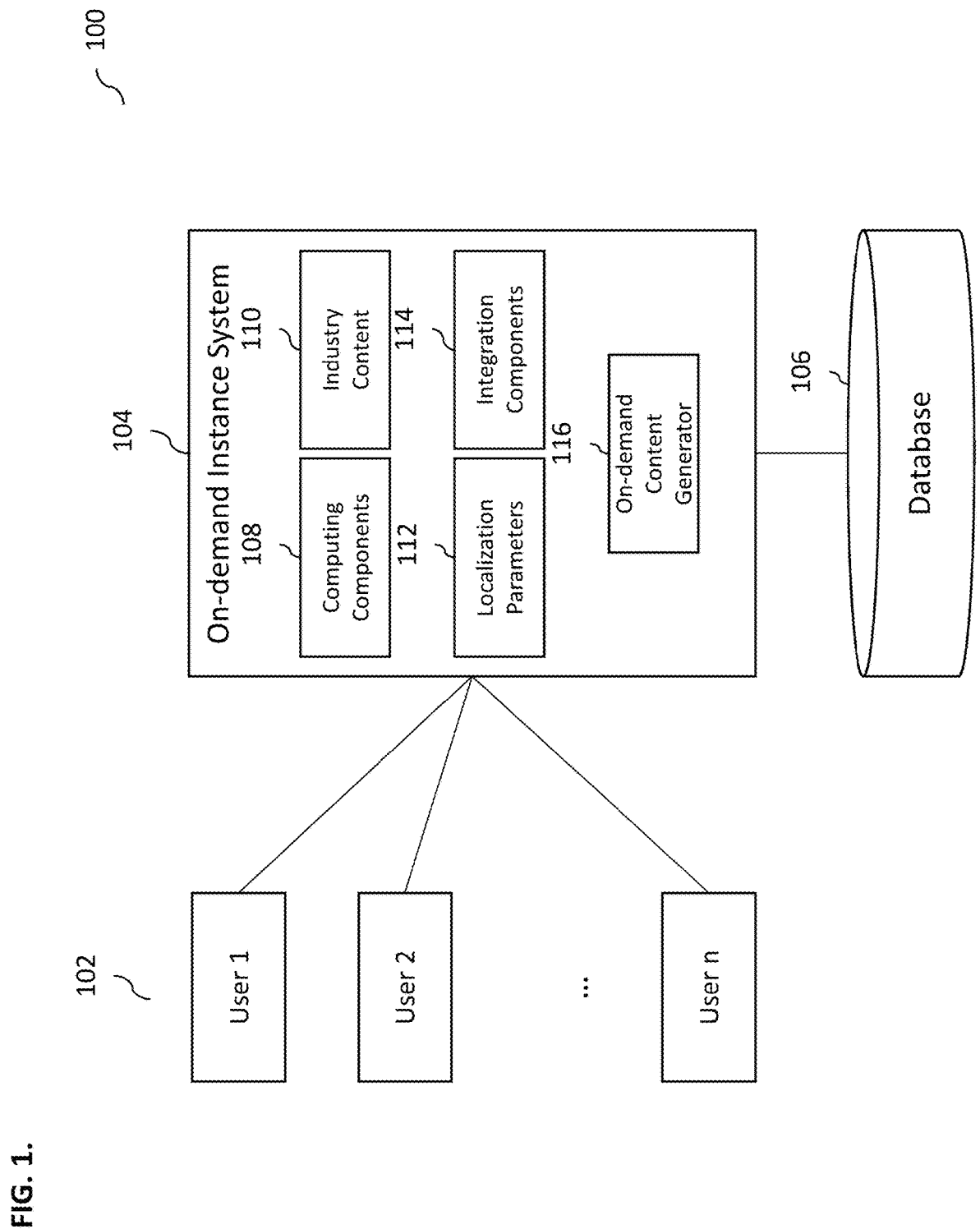
FIG. 1 illustrates an exemplary system for generation of on-demand content instances in computing systems, software applications, etc., according to some implementations of the current subject matter.

To address the deficiencies of currently available solutions, one or more implementations of the current subject matter provide for an ability to provide for generation and/or providing of on-demand instances (e.g., content, functionalities, computing applications, tec.) in computing systems.

Companies use a plurality of processes, applications and/or services in their operations. Processes, applications and/or services may be programs that an end-user runs to accomplish certain tasks and may work in conjunction with one or more back-end systems, which may store the data to be worked on, such as, for example, objects and other data, as well as logic for manipulating the data, such as for example transactions or other logic. Examples of back-end systems may include database systems, enterprise resource planning ("ERP") systems, and customer relationship management ("CRM") systems.

Such systems typically have a specific computing system landscape, content delivery capabilities and/or implementation aspects. Each of these have various issues that may be associated with them. For example, computing systems landscape can become increasing fragmented and complex with addition of new computing components, entities, data processes, etc. Existing and/or legacy systems may need to be integrated and/or constantly upgraded to ensure that there is interoperability with newly added computing components, computing systems, workflows, etc. To ensure that there is interoperability between different computing solutions, systems, components, etc., a manual effort in re-wiring integrations may be required, which results in a loss of any custom-developed content, increase in total cost of ownership, time delays, etc.

In some cases, often computing systems are provided with out-of-the-box best-practice templates and content, however, they may be limited to what various standard products may offer with no-ability to share content. Further, there might be no easy delivery mechanism available to publish and consume content while guiding the users by providing with recommendations, ratings, contents, scripts, etc. The existing content stores (e.g., databases, etc.) typically have thousands of content packs that may need human expertise to decipher and then implement in a particular computing system. In view of the complexity and the breadth of what enterprise software offers, this complexity may grow even more.

In some implementations, the current subject matter may be configured to provide a mechanism (e.g., through automation, recommendations, etc.) to search for, select, and provide most relevant (e.g., "best") content instances (e.g., computing functionalities, software applications, content data, metadata, etc.) in response to queries, search requests, etc. The current subject matter may also be configured to allow users to navigate, analyze and/or implement delivered content. The delivered content may be specific to a particular geographic region, software application and/or environment, computing system, user, etc. Further, delivered content may be re-usable in different scenarios (e.g., systems implementations in one computing environment may be applicable to another computing environment). In this way, for example, diverse forms of content, data, and software applications may be combined in either a pre-sales and/or post-sales implementation environment.

In some implementations, the current subject matter may be configured for generation, selection, and/or providing of one or more instances (e.g., applications, systems, content, etc.) on demand. Further, the current subject matter may be configured to allow reuse of custom-developed content, configuration parameters, etc. that may allow generation, selection, and/or providing of such on-demand instance in accordance with a specific system, application, setting, scenario, etc. This may include one or more core modules, integrations, baseline (e.g., master) systems, applications, content, etc. as well as the ability to reuse previously developed and/or or industry-specific systems, applications, content, etc.

FIG. 1 illustrates an exemplary system 100 for generating of on-demand content instances in computing systems, software applications, etc., according to some implementations of the current subject matter. The system 100 may be configured to operate in one or more clustered computing environments (e.g., Kubernetes). It may include one or more users, entities, applications, etc. 102 (e.g., user 1, user 2, . . . , user n, etc.), an on-demand engine/system 104, and a database. The engine 104 may include one or more computing elements (which may, for example, as discussed below, include one or more processors, one or more servers, one or more computing engines, one or more memory and/or storage locations, one or more databases, etc.) such as, components 108, an industry content 110, localization parameters 112, one or more integration components 114, and an on-demand instance generator 116. In providing for an end user 102 an on-demand instance, one or more of the computing elements in the engine 104 may be integrated into the on-demand instance.

The computing system/engine 104 may include a processor, a memory, and/or any combination of hardware/software, and may be configured to generate an on-demand instance that a user 102 may wish to obtain. An on-demand instance may refer to one or more or specific software applications, along with its associated data and/or content, and/or any configuration data that may specify one or more functions and/or features of the software application(s), data and/or content for a particular user 102 (e.g., a human user and/or another software application). In some cases, a single on-demand instance may be configured to rely on data, functions and/or features (and/or any combination thereof) of a computing component such that an instance is an integration of one or more computing components. A computing component may refer to a piece of software code that may be configured to perform a particular function, a piece and/or a set of data (e.g., data unique to a particular user and/or data available to a plurality of users) and/or configuration data used to create, modify, etc. one or more software functionalities to a particular user 102 and/or a set of users. For example, in a human resources computing environment, an instance may be a human resource instance that may integrate a login component (e.g., requiring entry of a login and a password) in order to access the human resources instance. The engine 104 may include one or more artificial intelligence and/or learning capabilities that may rely on and/or use various data, e.g., data related to and/or identifying one or more on-demand instances that have been previously requested by and/or generated for the user 102.

The elements of the system 100 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The elements of the system 100 may include any combination of hardware and/or software. In some implementations, the elements may be disposed on one or more computing devices, such as, server(s), database(s), personal computer(s), laptop(s), cellular telephone(s), smartphone(s), tablet computer(s), and/or any other computing devices and/or any combination thereof. In some implementations, the elements may be disposed on a single computing device and/or can be part of a single communications network. Alternatively, the elements may be separately located from one another.

In some implementations, the engine 104 may be configured to receive a selection from the user 102 concerning one or more on-demand instances. In such case, the user 102 may already know the specific on-demand instance(s) with which the user 102 wishes to interact and therefore, may select that on-demand instance(s) directly. In other situations, the end user 102 may not know which on-demand instance(s) are available. In these situations, the user 102 may transmit a query (e.g., a search query) seeking a specific instance(s).

In response to the user's direct command and/or a query, one or more computing components 108 may be selected by the engine 104 in order to perform a particular action and/or actions. For example, a user 102 may choose or define a business process such as 'Demonstrate hiring a person in a retail industry' and/or enter a new scenario. In either case, an HR on-demand instance may be generated using the plurality of the computer elements of the engine 104. Once the components 108 are selected, a particular industry content that may be associated with the selected component 108 may be identified and selected using industry content 110. In some implementations, the industry content may be extracted from the user's query, determined using prior on-demand instance generations that may or may not be similar to the user's query, and/or may be determined from a user's profile and/or determined in any other way. The industry content 110 may be configured to access one or more databases (e.g., database 106) to determine and/or identify a specific industry content.

The localization parameters 112 may be configured to determine and/or identify and/or select one or more localization parameters for the selected computing component 108. Again, localization (e.g., geographical-location-specific, language-specific, etc.) parameters may be deciphered from the user's direct command and/or query (e.g., the user may specifically identify such parameters). Alternatively, or in addition to, localization parameters 112 may be determined by developing a history of prior on-demand instance generations, and/or by using a user profile, which may be stored and/or later accessed in one or more databases (e.g., database 106).

In some implementations, more than a single computing module 108 may be required to provide a desired functionality for the end user 102. In these situations, integration of the selected computing elements, determined, for example, from a direct user command and/or as the result of answering a user query, with any existing computing elements may be required. To assist with such integration, one or more integration components 114 may be identified and/or selected. Identification of such integration components 114 may be based on the requirements of the integrating components/systems and/or selected computing elements. In some implementations, integration requirements may be determined using previous on-demand instance generations, by accessing one or more databases, a user profile and/or using any other factors.

An on-demand instance generator 116 may be configured to receive the information about the selected components 108, industry content 110, localization parameters 112, integration components 114, and/or any other data, and generate one or more on-demand instances and provide one or more instances to the user. The provided on-demand instances may be stored in the database 106 so that they can be re-used, such as, in response to another query from the same user 102 and/or different users.

In some implementations, one or more user interfaces may be configured to be generated by the system 104 to display the generated instances to the user 102. The user 102 may determine that the generated instances are responsive to the user's query and/or may be used for the user's purposes. The user may also transmit an appropriate indication (e.g., positive, negative, etc.) to the engine 104, which may be stored and used for future on-demand instance generations. An application programming interface (API) may be used for transmission of the user's indication to the engine 104.

In some implementations, the engine 104 may be configured to update the previously generated on-demand instances. Such update may occur automatically, whereby, for example, the engine 104 may be configured to receive updated data from one or more elements 108-116 and/or user(s) 102, and generate updated on-demand instances. Alternatively, or in addition to, the update to the generated on-demand instances may be transmitted to the engine 104, for example, by one or more users 102, and the engine 104 may be requested to execute such update.

Once the on-demand instances are generated, a user 102 may interact with them to implement tasks. In an exemplary, non-limiting scenario, a sales agent may go through various user interfaces of the on-demand instances to provide a demonstration to a customer of what a final software product will do and how it will look. In this pre-sales scenario, the sales agent can reconfigure the on-demand instance dynamically to show the customer variations of software configurations. Once purchased and/or licensed, the end user can use the generated on-demand instances to perform tasks in a "real world" environment (e.g., post sales). With the integration of various software modules 108 being part of the system, going to a "live" date with customers and employees may be much faster.

Figure 2:
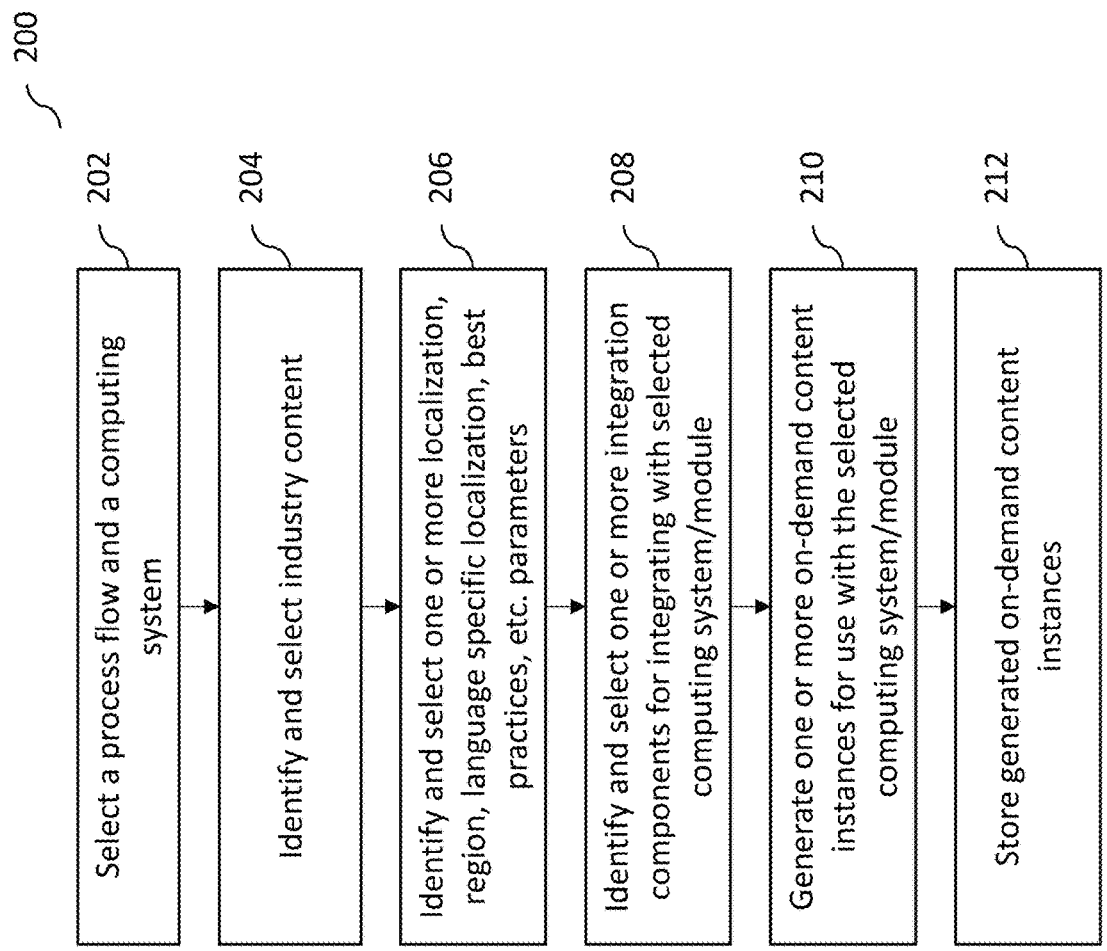
FIG. 2 illustrates an exemplary method for on-demand instance generation, selection, providing, etc., according to some implementations of the current subject matter.

FIG. 2 illustrates an exemplary method 200 for on-demand instance generation, selection, providing, etc., according to some implementations of the current subject matter. The method 200 may be configured to performed by the system 100 shown in FIG. 1. The method 200 may be configured to be performed using an enterprise resource planning system and/or any other computing system. In such system, one or more computing components, computing modules, software applications, data, etc. may be available for selection, use, generation, providing to one or more users.

Referring to FIG. 2, at 202, one or more process flows (e.g., HR, sales, etc.) and/or computing systems, computing components 108 may be selected. The selection may be in accordance with a particular content, purpose, setting, computing system, etc. For example, a user may enter a direct command to execute a particular task such as in the areas of financial, human resources, sales, etc. aspects. In other examples, the user 102 may not know a particular software application that the user needs, but instead may enter a query, such as "Leave Request," and the current subject matter system may be configured to select computer component(s) 108 that may generate the HR software application the user needs.

Once the computing component(s) 108 is selected, a particular industry content (e.g., content 110) may be identified and/or selected, at 204. For example, the industry content may relate to car manufacturing, consumer products distribution, etc. The content may include any data that may be stored in one or more databases (e.g., database 106 as shown in FIG. 1). The components 108 may be configured in accordance with a particular selected industry content 110 (e.g., components 108 may be configured in one way for the purposes of an HR system that may be implemented in a construction industry, but may be configured in another way for the purposes of an HR system of a law firm, etc.).

The process 200 may proceed to identify and/or select one or more localization, region, language-specific localization, best practices, etc. parameters that may be used for the purposes of configuring one or more selected components, at 206. The localization parameters may relate to specific geographical region(s) (e.g., continent, country, state, city, street, address, locality, and/or group thereof, etc.), language(s) (e.g., English, German, etc.), specific computing system(s), particular industry related system(s), etc. As discussed above, the engine 104 may be configured to include one or more localization parameters 112 that may be used in the process 200.

At 208, one or more integration modules 114 may be identified and/or selected for the purposes of integrating selected components 108. Integration may be necessary to ensure compatibility of selected components 108 with one or more computing system with which the components may be integrated. This may, for example, ensure that proper interfaces (e.g., APIs, UIs, etc.) are provided to ensure interoperability of components, systems, etc. Further, proper metadata is used for the purposes of integration. Any other integration aspects may be determined and/or identified.

Once the information relating to the selected components, industry-specific content, localization parameters (e.g., region-localization parameters, language-localization parameters, etc.), and integration modules is received, the engine 104 (as shown in FIG. 1), using on-demand instance generator 116, may be configured to generate one or more on-demand instances that may be responsive to the user's query, at 210. For example, the response may be in a form of a computing functionality that may be instantly integrated into the user's system. Alternatively, the response may include data that may be readily consumed by the user's system. Any other on-demand instances may be generated for user's consumption.

At 212, the generated on-demand instance may be stored in the database 106 and/or at any other location. The stored on-demand instance may be re-used at a later time. It may also be updated, if necessary and/or desired.

In some implementations, the system 100, when generating an on-demand instance, may be configured to separate any data and/or configuration associated with such on-demand instance from a baseline or master instance (e.g., an instance that may already exist in a computing system for which generation of the on-demand instance is requested). This may allow the generated on-demand instance to be more reusable in many scenarios. This may allow a creation of a "lean" baseline instance with a minimal baseline content. For example, the baseline instance may represent a core content that will always be required and any generated on-demand instances may be built on top of such baseline instance. Any custom content that may be generated in connection with an on-demand instance may also be re-used. Such content may be stored and then imported into any new on-demand instances. Additionally, on-demand instances may specify particular integration parameters for integration with a multiple computing systems.

Further, in some implementations, machine learning may be applied to various unstructured data (e.g., big data, unstructured documents, siloed systems, emails, websites, etc.) for the purposes of generating on-demand instances. To do so, the current subject matter may be configured to include a semantic layer to process such unstructured data. Processing of the unstructured data by the semantic layer may include use of similarity searches (e.g., searches of similar scenarios, which may be based on industries, regions, localizations etc.), analysis (e.g., in sales, win/loss data may be analyzed to highlight such data during sales cycles for the purposes of determining what works and what did not work against a competitor), recommendations (e.g., instances may be ranked based on recommendations (e.g., from users)), best practices, etc. for the purposes of on-demand instance generation.

Figure 3:
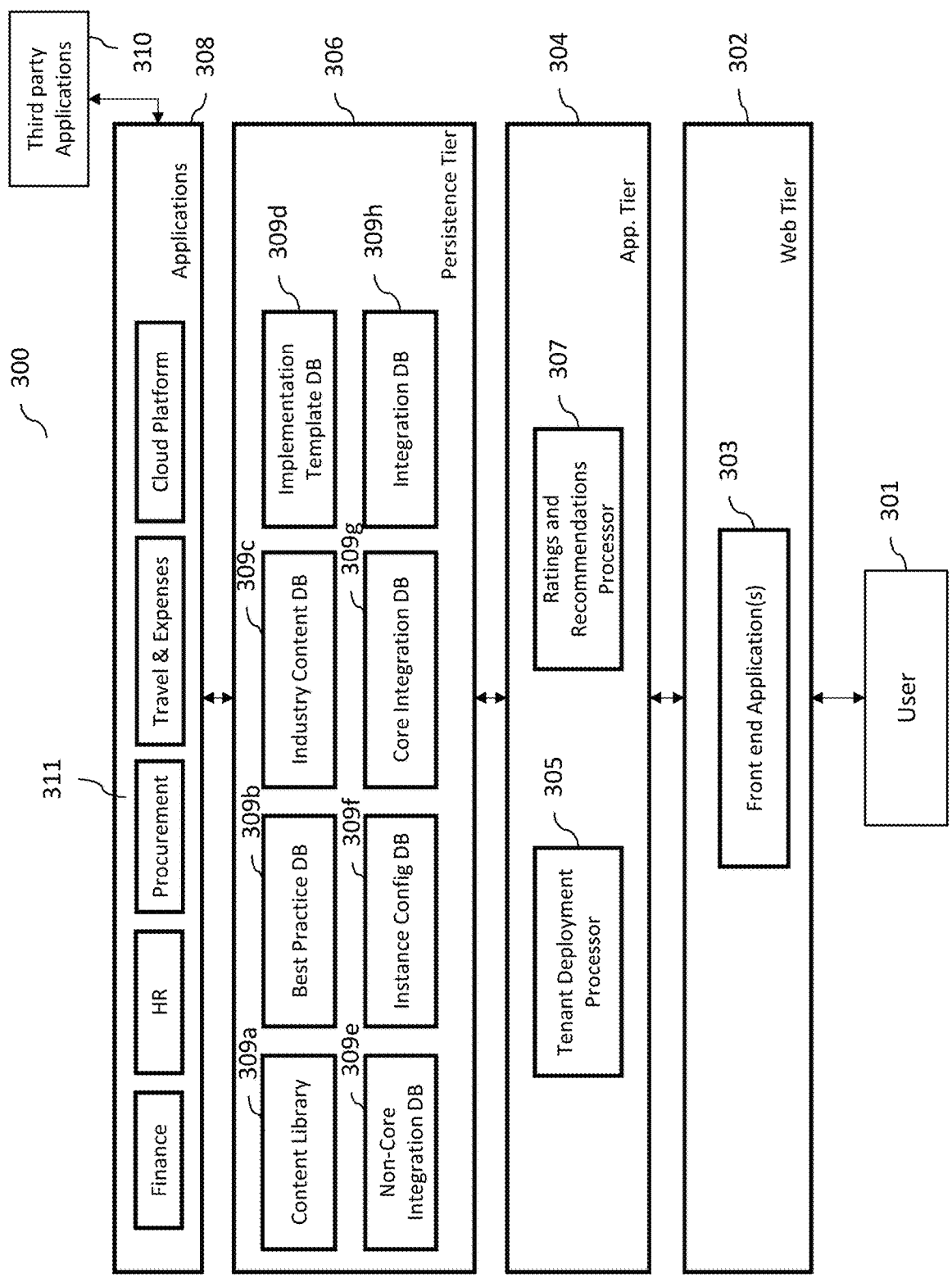
FIG. 3 illustrates an exemplary system architecture for generating an on-demand instance, according to some implementations of the current subject matter.

FIG. 3 illustrates an exemplary system architecture 300 for generating an on-demand instance, according to some implementations of the current subject matter. The system 300 may include one or more tiers. The tiers may include a web tier 302, an application tier (which, for example, may include processors for executing various actions by the user) 304, a persistence tier 306, and applications (which may include various content-specific environments (e.g., finance, HR, procurement, travel and expenses, cloud platform, etc.) 308. One or more elements of the system 300 may be configured to be integrated into and/or be part of and/or be one or more elements of the system 100, such as, the engine 104 and/or the database 106. For example, one or more databases of the persistence tier 306 may be part of the database 106 shown in FIG. 1.

The tiers 302-308 may include any combination of hardware and/or software. In some implementations, the tiers may be disposed on one or more computing devices, such as, server(s), database(s), personal computer(s), laptop(s), cellular telephone(s), smartphone(s), tablet computer(s), and/or any other computing devices and/or any combination thereof. In some implementations, the tiers may be disposed on a single computing device and/or can be part of a single communications network. Alternatively, the tiers may be separately located from one another.

The tiers of the system 300 may be communicatively coupled using one or more communications networks. The communications networks may include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The web tier 302 may include on or more front end applications 303 that may be accessible by a user 301. For example, a front end application 303 may include a browser and/or any other user interface that the user 301 may use to request generation of an on-demand instance and/or access existing instances that may have been already generated.

Once the request from the user 301 is received by the front end application 303, the request may be transmitted to the application tier 304. The application tier 304 may include a tenant deployment processor 305 and a rating and recommendations processor 307. The processor 305 may be configured to determine various deployment parameters for one or more tenant systems for which on-demand instances may be generated. Tenant deployment system 305 may regulate which users from each tenant may be allowed to access the system 300 and, once accessed, what on-demand software applications may be accessible to the users, such as, for example, through a licensing agreement with the on-demand provider. The processor 307 may be configured to determine ratings and/or recommend specific content that may be used for generation of an on-demand instance requested by the user. The ratings may be used to assess applicability of specific on-demand instances (e.g., popularity ratings, etc.), which may help in providing pertinent and up-to-date content and instance details to the user. Moreover, such ratings may be used to determine and/or select specific content that may be included with a particular on-demand instance.

To do so, the processors 305, 307 may be configured to access the persistence tier 306. The persistence tier 306 may include one or more databases 309 (a, b, c, d, e, f, g, h). One or more databases 309 may be part of the database 106 shown in FIG. 1, and/or vice versa. The databases 309 may include a content library 309a, a best practices database (DB) 309b, an industry content database 309c, an implementation template database 309d, a non-core integration database 309e, an instance configuration database 309f, a core integration database 309g, and an integration database 309h. Each of the databases 309 may be accessed by the processors 305, 307 by generating and transmitting an appropriate query. The databases 309 may be configured to store data in various formats, e.g., tables, key-value, column-store, row-store, etc.

The content library database 309a may be configured to store various information relating to data, computing components, parameters that may be accessed for the purposes of generating a particular on-demand instance. For example, certain content may be specific to various applications (e.g., applications 311 that are part of the tier 308) for which and which may use the on-demand instance. For example, a Finance application (one of the exemplary applications 311) may require a specific accounting content and/or applications (e.g., invoice processing software, remittance software, ledgers, etc.). Similarly, an HR application (another one of the exemplary application 311) may require an HR-related content (e.g., benefits information content, on-boarding applications, etc.). Other applications 311 may likewise require content that may be specific to them. Moreover, the content may be specific to a particular industry (e.g., which may also be present in the industry content DB 309c) in which a particular application 311 is being used.

The best practices database 309b (which may be related to the industry content 110 and/or localization parameters 112 as shown in FIG. 1) may be accessed to determine whether a specific on-demand instance may need to include and/or be customized in accordance with specific best practices that may be associated with a particular application and/or industry and/or local customs (e.g., writing of a date in a particular format) for which and which may use the on-demand instance. In some cases, best practices content in the best practices database 309b may be industry-agnostic and may include non-industry relevant processes that may be packaged therein. The processors 305, 307 may be configured to access this content to determine how such content may need to be integrated into the on-demand instance requested by the user 301.

The industry content database 309c may include specific information relating to a particular industry that may be identified in the user's query for an on-demand instance. For example, the user may be interested in manufacturing and thus, certain aspects of manufacturing (e.g., machinery, fabrication, etc.) may need to be identified for the purposes of generating the on-demand instance.

The implementation template database 309d may store one or more templates (e.g., that may be industry specific, content specific, etc.) that the processors 305, 307 may use for the purposes of generating the on-demand instance. In an example implementation, templates may correspond to one or more computing structures that may include one or more nodes (that may include one or more functionalities, content, etc.), which may be executed as part of generating an on-demand instance and/or executing the generated on-demand instance. For example, the stored templates may include one or more fields that may be populated using data from one or more other databases 309. The fields in the template(s) may be used to include one or more identifiers that may be indicative of specific content, software modules, applications, functionalities, etc. that may be accessed when an on-demand instance is generated and/or being executed/used by a user.

FIG. 4 illustrates an exemplary retail industry template 400 that may be used for generation of an on-demand instance. For example, the template 400 may include various sections or areas 402-410 that may be populated with appropriate information that relates to the type of information (e.g., content, applications, functionalities, modules, etc.) as well as whether such information is unique to retail. Each section 402-410 may be represented as a table that may include an area column 401, a type column 403, and specificity (e.g., "What's unique to retail?") column 405. For example, section 402 may correspond to "core" or base content that may be required for generating an on-demand instance based on the template 400. As shown in FIG. 4, the column 401 ("Area") specifies that the content listed in the section 402 is the "Core" content. The "Type" column 403 indicates the type of content that may be required, e.g., "Company Structure", "Job Profiles", "Main Personas", "Org Structure", and "Localizations". Each of the types 403 may correspond to various specificities that may be particular to the retail industry, as shown in column 405.

The other sections 404 ("Employee Central"), 406 ("Talent Acquisition", and "Talent Management"), 408 ("Learning"), and 410 ("Reporting", "Integration", "Planning", etc.) may likewise include various information that may be required for an on-demand instance. The information may be obtained from one or more databases 309 (shown in FIG. 3), database 106 (shown in FIG. 1) and/or elements of the engine 104 (shown in FIG. 1).

The integration databases 309e, 309g and 309h may store information, data, parameters, etc. relating to various computing requirements that may be needed to integrate the on-demand instance into various computing systems. The integration databases may store information relating to whether a specific software, functionality, etc. may be needed for the on-demand instance to be operation and/or usable by the user, such as, for example to complete one or more functions of an on-demand instance (e.g., a core component (stored by the core database 309g)), whether is not required and/or optional (e.g., a non-core (as stored by the non-core database 309e)), and various other information (e.g., availability of licenses, etc. (as stored by the integration database 309g)). A computing software, functionality, etc. is not required when it is not necessary to complete one or more functions of the on-demand instance. However, such non-required component may add features that may assist in performing one or more functions, whereby such functions may be accomplished, at a minimum, by the required components.

Figure 5:
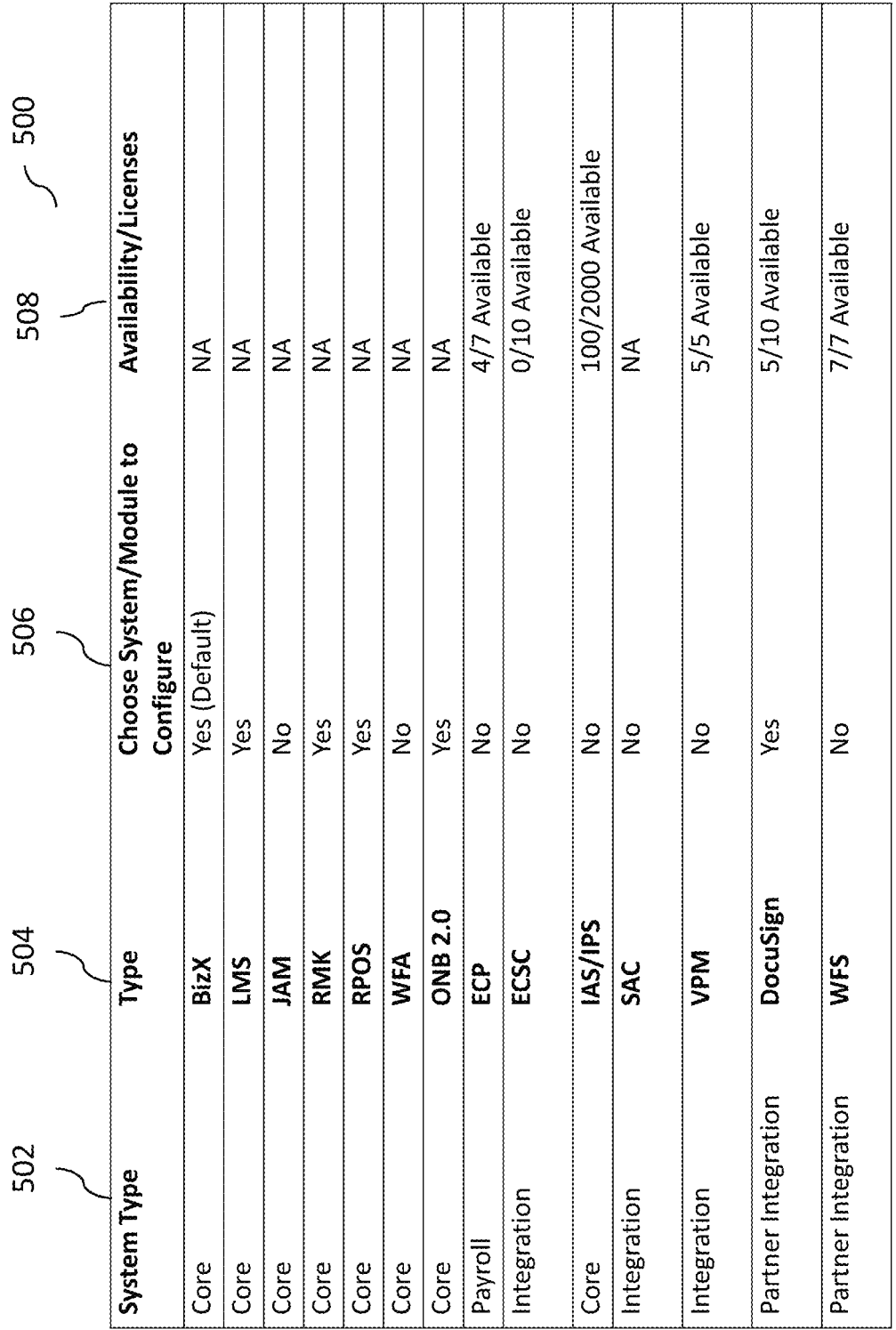
FIG. 5 illustrates an exemplary integration specification, according to some implementations of the current subject matter.

FIG. 5 illustrates an exemplary integration specification 500, according to some implementations of the current subject matter. As shown in FIG. 5, the integration specification 500 may be in a form of a table that may indicate whether or not various software, functionalities, etc. are core, non-core, partner, etc. software, functionalities, etc., software, functionalities, etc. type, whether not a specific module/system of the component may be configurable, and/or whether licenses are available/required. In particular, the specification 500 may include a system type column 502, a type column 504, a column 506 that indicates a system/module that may be selected for configuration, and a column 508 that indicates whether use licenses that may be associated with software, functionalities, etc. may be available. For example, the column 502 indicates that there are 7 core software, functionalities, etc. that may be required (such as to ensure generation and/or execution of the on-demand instance). Each such core software, functionality, etc. has a type (e.g., BizX, etc.) as shown in column 504. One or more of the core software, functionalities, etc. may be selected for configuration (e.g., as shown by "Yes" and "No") in column 506. Lastly, column 508 indicates that no use licenses are required for use of the core software, functionalities, etc., which may be different for other software, functionalities, etc. listed in the column 502 (e.g., "Payroll" software indicates that 4/7 use licenses are available). As can be understood, any other information may be included in the integration specification 500.

The instance configuration database 309f may be configured to store information relating to configuration of the on-demand instance that has been requested. In some implementations, the instance configuration database 309f may include information on how a specific instance may be configured, including one or more elements, such as, core modules it may have (e.g., a learning module, an onboarding module, etc.). In addition, it may include details on instance version(s), patch(es), user(s) configured, etc. FIG. 6 illustrates an exemplary final on-demand instance configuration 600 that may be generated by the system 300, according to some implementations of the current subject matter. The final on-demand instance configuration 600 may be represented as a table (similar to configuration 500 table in FIG. 5) and may include a system type column 602, a type column 604, and a system/module to configure column 606. It include an indication of various core components (as indicated in column 602) that will need to be included ("Core"), partner components ("Partner Integration"), and/or other information. The configuration 600 may be derived using configuration 500 and may be configured to exclude certain information, such as license information, and/or any software, functionalities, etc. that might have been excluded (e.g., Partner Integration "WFS" shown in FIG. 5, among others, has been excluded from the final configuration 600). Exclusion of software, functionalities, etc. from final configuration 600 may be performed automatically, manually, and/or both. The configuration 600 may be presented to the user 301 and if such configuration is acceptable, the user 301 may be prompted to build (e.g., using processors 305, 307) the configuration 600 so that it may be implemented for use by the user 301.

In some implementations, the processors 305, 307 may be configured to access the databases 309 in accordance with one or more applications 311 that may be included in the applications tier 308. Alternatively, or in addition to, the processors 305, 307 may be configured to also access one or more third-party applications 310 to supplement an on-demand instance. The applications 310 may include any types of application, computing systems, etc. and may be subject matter specific (e.g., finance, human resources, procurement, travel & expenses, cloud platform, etc.).

Figure 7:
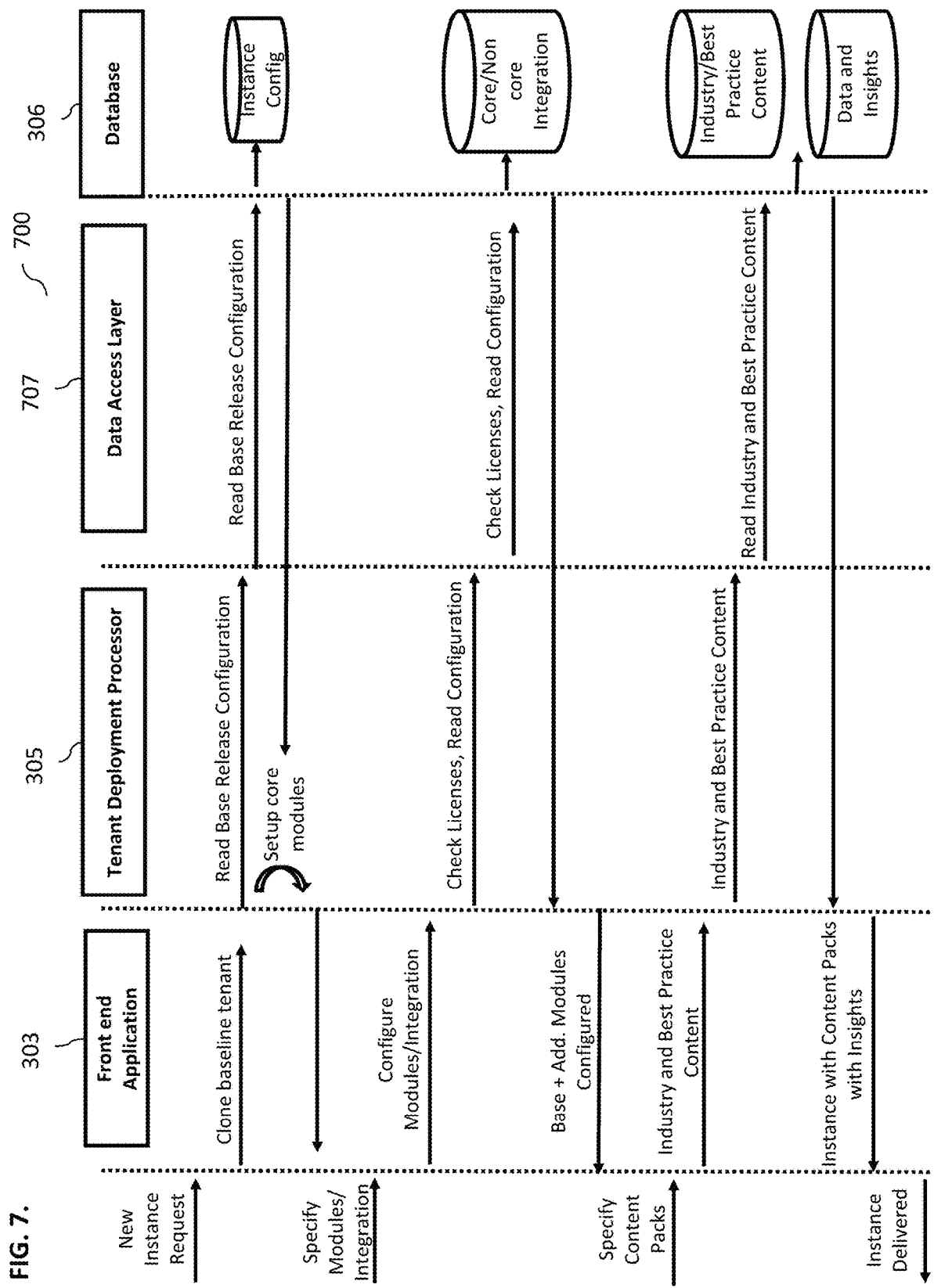
FIG. 7 illustrates an exemplary process for generating an on-demand instance, according to some implementations of the current subject matter.

FIG. 7 illustrates an exemplary process 700 for generating an on-demand instance, according to some implementations of the current subject matter. The process 700 may be executed by the system 300 shown in FIG. 3.

The process 700 may be initiated upon receiving a new instance request from a user (e.g., user 301, as shown in FIG. 3 (not shown in FIG. 7)). The request may be received by the front end application 303. The application 303 may be configured to generate a duplicate and/or a clone of a baseline tenant computing system (e.g., which may include any combination of software and hardware) where the requested instance may be used. This way the generated instance may be tested on a clone system, rather than on a deployed system, for example, before it is deployed.

The tenant deployment processor 305 may be configured to read the configuration of the baseline tenant computing system and provide it to the data access layer 707, which may be configured to read the configuration. The data access layer 707 may generate a request to the database layer (or persistence tier) 306, and in particular to the instance configuration database 309f. The instance configuration information may be returned to the tenant deployment processor 305. The processor 305 may also determine which core computing modules for the requested instance may be necessary and perform an appropriate setup. Setting up of the core computing modules may be performed by the processor 305 upon receipt of the baseline computing tenant system information, upon receipt of the instance configuration, and/or at any other time. The processor 305 may be configured to perform one or more setup tasks simultaneously.

The processor 305 may then be configured to provide the core modules setup information along with instance configuration to the front end application 303, which may request the user to specify one or more content, computing modules, software applications (including any third party software applications), systems, etc. for inclusion into the instance. In some implementations, an administrator user may be configured to determine how a particular on-demand instance may work and once such instance has been generated, an end user may be configured to have access to the generated instance for executing various tasks, and may or may not be permitted to perform additional configuration of the generated instance.

Once the user identifies such content, computing modules, applications (including any third party applications), systems, etc. for inclusion into the instance, the application 303 may perform configuration of the specified content, computing modules, applications (including any third party applications), systems, etc. The processor 305 along with the data access layer 707 may also check for any licenses and/or read configurations of the specified content, computing modules, applications (including any third party applications), systems, etc. The core and/or non-core integration databases 309g, 309e may be accessed for integration information related to the specified content, computing modules, applications (including any third party applications), systems, etc. This information may then be provided to the front end application 303.

The front end application 303 may then generate a user interface (e.g., such as the one shown in FIGS. 4-6) that the baseline components and/or any additional specified content, computing modules, applications (including any third party applications), systems, etc. have been configured for inclusion into the requested instance. At this time, the application 303 may also request the user to specify any content packs (e.g., themes, etc.) that should be applied to the configuration of the instance. This may involve specification of particular industries (e.g., manufacturing, retail, etc.) and/or industry best practices.

The processor 305 and data access layer 707 may be configured to access best practices and industry content databases 309b, 309c and/or any other databases 309 (e.g., for data and insights) for one or more such content packs and apply the content packs to the configured instance. The configured instance with content pack(s) may then be provided to the application 303, which may deliver (e.g., generate a user interface) to the user.

In some implementations, the current subject matter may have one or more of the following advantages. It is capable of generating an instance (e.g., one or more software applications, one or more computing functionalities, one or more computing components, one or more computing systems, one or more contents, one or more data, metadata, and/or any other instances) on demand by bringing baseline content, configuration, scripts, releases, integrations, industry, and/or best practice content packs together in an end-to-end guided wizard-based tool. In generating such on-demand instance, the current subject matter may be configured to connect to one or more content stores, leverage any underlying provisioning APIs, consume content(s) from one or more content pack store (e.g., a publicly available database of content that may be published for a particular system with ratings and/or recommendations). The current subject matter may also be configured to connect one or more system processing cycles (e.g., a sales cycle) to one or more post implementation processes to allow further analysis, re-use of the information, etc. Additionally, the current subject matter may be configured to identify and provide insights to various similarity patterns, recommendations, past user behavior, etc. This eliminates a need to search and find relevant and up-to-date content in content stores while guiding the user through hints and recommendations.

Figure 8:
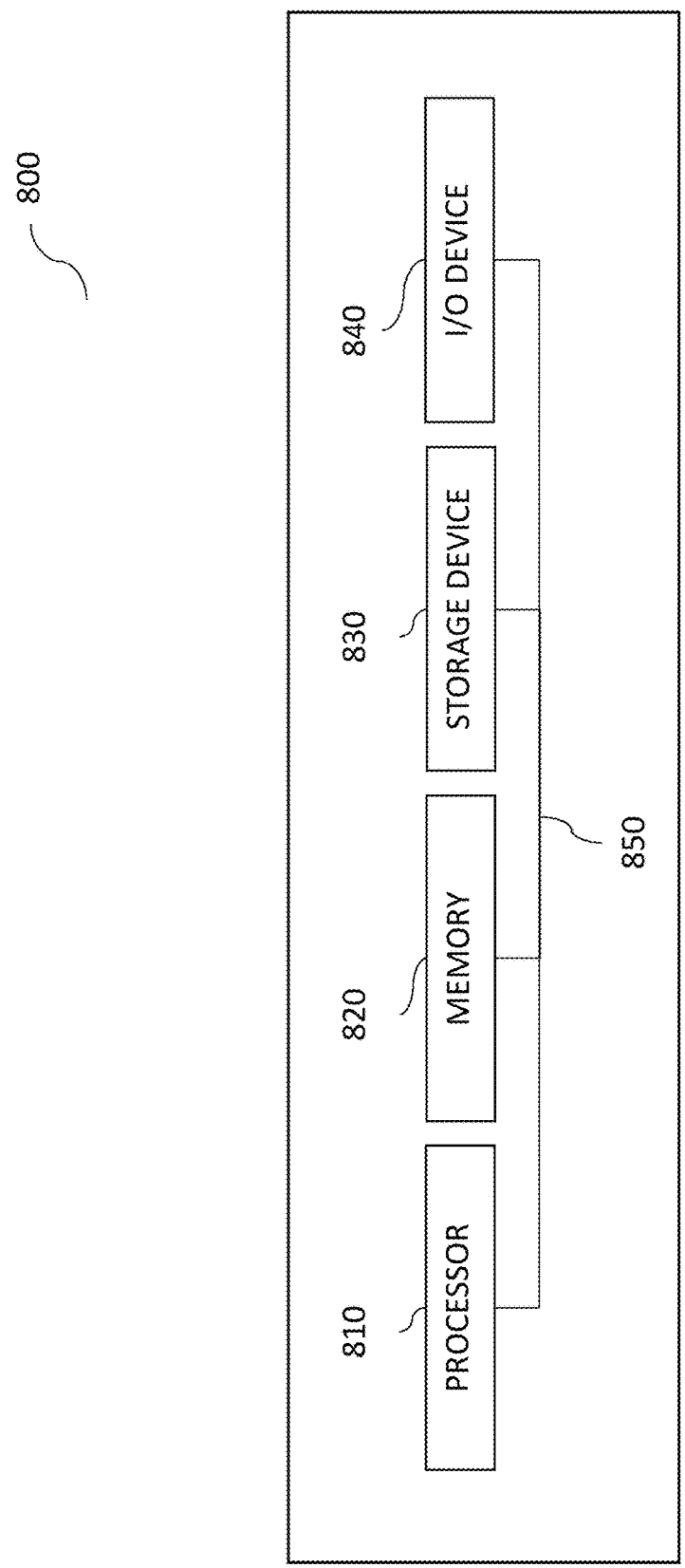
FIG. 8 illustrates an exemplary system, according to some implementations of the current subject matter.

In some implementations, the current subject matter can be configured to be implemented in a system 800, as shown in FIG. 8. The system 800 can include a processor 810, a memory 820, a storage device 830, and an input/output device 840. Each of the components 810, 820, 830 and 840 can be interconnected using a system bus 850. The processor 810 can be configured to process instructions for execution within the system 800. In some implementations, the processor 810 can be a single-threaded processor. In alternate implementations, the processor 810 can be a multi-threaded processor. The processor 810 can be further configured to process instructions stored in the memory 820 or on the storage device 830, including receiving or sending information through the input/output device 840. The memory 820 can store information within the system 800. In some implementations, the memory 820 can be a computer-readable medium. In alternate implementations, the memory 820 can be a volatile memory unit. In yet some implementations, the memory 820 can be a non-volatile memory unit. The storage device 830 can be capable of providing mass storage for the system 800. In some implementations, the storage device 830 can be a computer-readable medium. In alternate implementations, the storage device 830 can be a floppy disk device, a hard disk device, an optical disk device, a tape device, non-volatile solid state memory, or any other type of storage device. The input/output device 840 can be configured to provide input/output operations for the system 800. In some implementations, the input/output device 840 can include a keyboard and/or pointing device. In alternate implementations, the input/output device 840 can include a display unit for displaying graphical user interfaces.

Figure 9:
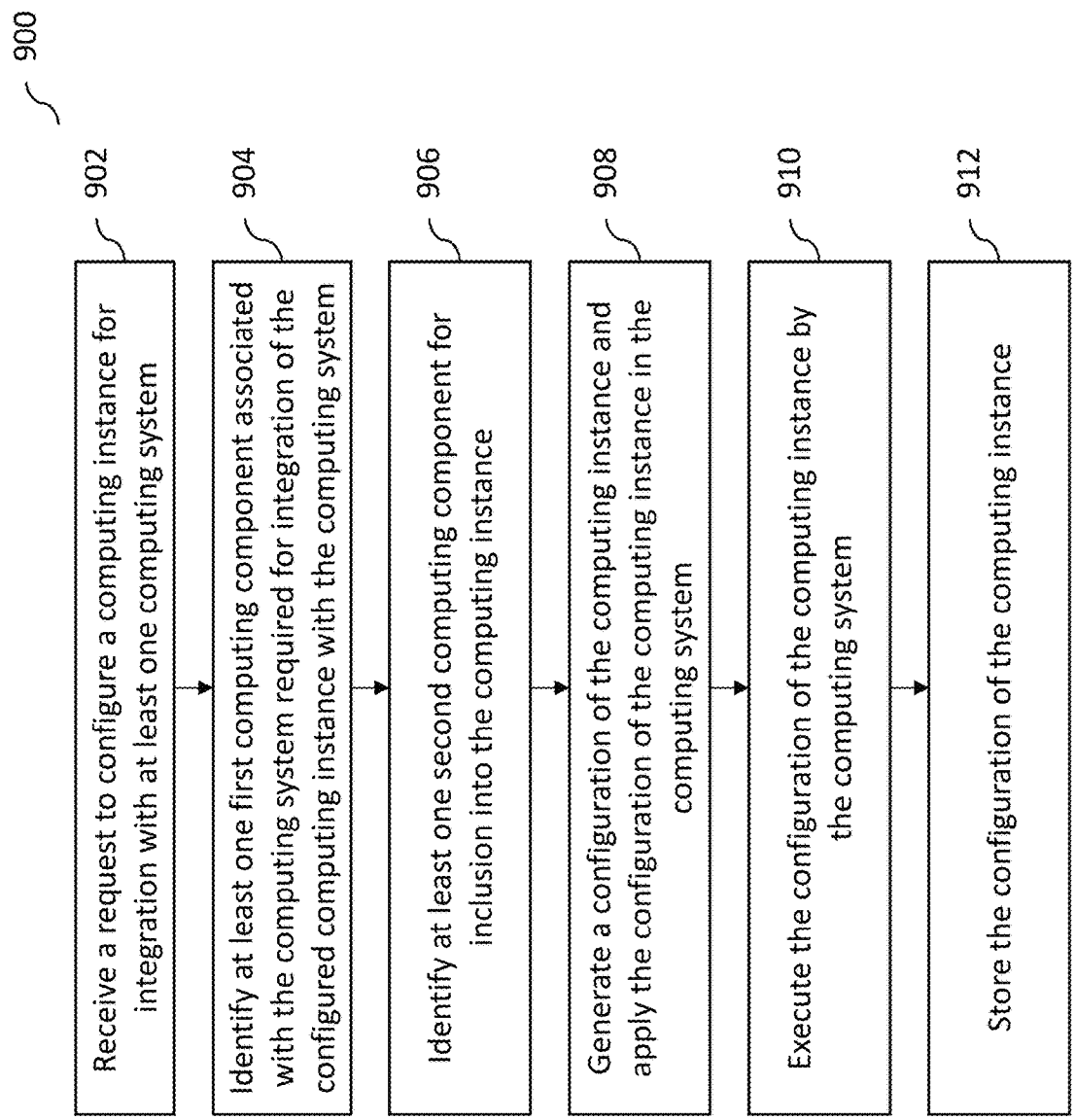
FIG. 9 illustrates an exemplary method, according to some implementations of the current subject matter.

FIG. 9 illustrates an exemplary method 900 for generating and/or configuring a computing instance, according to some implementations of the current subject matter. The method 900 may be executed by the system 100 (shown in FIG. 1) and/or system 300, as shown in FIG. 3. The method 900 may implement the techniques discussed above in connection with FIGS. 1-7.

At 902, a request to configure a computing instance for integration with at least one computing system may be received. The request may be received from the user 102 (as shown in FIG. 1) and/or user 301 (as shown in FIG. 3). The request may relate to requesting generation, selection, configuration, and/or providing one or more such computing instances on demand.

At 904, at least one first computing component (e.g., a core component that may be stored in the core database 309g) associated with the computing system required for integration of the configured computing instance with the computing system may be identified. Such identification of required or core computing components may be performed by the processor 305 as shown in FIG. 5 (and/or engine 104 shown in FIG. 1).

At 906, at least one second computing component (e.g., non-core component that may be stored in the non-core database 309e) for inclusion into the computing instance may be identified. The second computing component might not be required for integration of the configured computing instance with the computing system. It may or may not be optional.

At 908, a configuration of the computing instance may be generated using the identified first and/or second computing components. The configuration may also include application of any content packs, and/or other parameters to ensure the configured instance is properly integrated. The configuration of the computing instance may be applied in the computing system. At 910, the configuration of the computing instance may be executed by the computing system. It may also be stored in one or more databases 309, at 912.

In some implementations, the current subject matter may include one or more of the following optional features. The computing instance may include at least one of the following: one or more software applications, one or more computing functionalities, one or more computing components, one or more computing systems, one or more contents, one or more data, one or more metadata, and any combination thereof.

In some implementations, the method 900 may include receiving another request for configuring the computing instance for integration with at least another computing system, accessing the stored configuration of the computing instance, applying the stored configuration of the computing instance in at least another computing system, and executing the stored configuration of the computing instance by at least another computing system. This may allow reuse of stored configurations/instances.

In some implementations, the computing instance may be configured using a predetermined stored configuration template (e.g., using database 309d as shown in FIG. 3). The computing instance may be configured using at least one of the following: one or more integration parameters associated with at least one of: at least one first component and at least one second component, one or more best practices parameters associated with the at least one computing system, one or more industry parameters associated with the at least one computing system, one or more localization parameters associated with at least one computing system, and any combination thereof. These may be stored in one or more databases 309 shown in FIG. 3.

In some implementations, the configuration of the computing instance may include a configuration of at least one of: at least one first computing component, at least one second computing component, and any combination thereof. The configuration of the computing instance may include a configuration associated with a predetermined content.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
  receiving a request to configure a computing instance for integration with at least one first computing system;
  identifying at least one first computing component associated with the at least one first computing system required for integration of the configured computing instance with the at least one first computing system, wherein the at least one first computing component required for integration comprises a baseline piece of software code and/or data;
  identifying at least one second computing component for inclusion into the computing instance, wherein the at least one second computing component is not required for integration of the configured computing instance with the at least one first computing system, wherein the at least one second computing component that is not required for integration comprises one or more industry parameters and one or more localization parameters specific to a geographic region and/or language;
  generating, using the identified at least one first computing component and the at least one second computing component along with at least one integration component comprising at least one user interface and/or at least one application program interface, a configuration of the computing instance and applying the configuration of the computing instance in the at least one first computing system;
  executing the configuration of the computing instance by the at least one first computing system; and
  storing the configuration of the computing instance.

2. The method according to claim 1, wherein the configuration of the computing instance includes configuration of at least one of the following: one or more software applications, one or more computing functionalities, one or more computing components, one or more computing systems, one or more contents, one or more data, one or more metadata, and any combination thereof.

3. The method according to claim 1, further comprising
  receiving another request for configuring the computing instance for integration with at least a second computing system;
  accessing the stored configuration of the computing instance;
  applying the stored configuration of the computing instance in the at least second computing system; and
  executing the stored configuration of the computing instance by the at least second computing system.

4. The method according to claim 1, wherein the computing instance is configured using a predetermined stored configuration template.

5. The method according to claim 1, wherein the computing instance is configured using at least one of the following: one or more best practices parameters associated with the at least one first computing system, and any combination thereof.

6. The method according to claim 1, wherein the generating further comprises configuring at least one of: the at least one first computing component, the at least one second computing component, and any combination thereof.

7. The method according to claim 1, wherein the generating further comprises configuring the computing instance using a predetermined content.

8. A system comprising:
  at least one programmable processor; and
  a non-transitory machine-readable medium storing instructions that, when executed by the at least one programmable processor, cause the at least one programmable processor to perform operations comprising:
  receiving a request to configure a computing instance for integration with at least one first computing system;
  identifying at least one first computing component associated with the at least one first computing system required for integration of the configured computing instance with the at least one first computing system, wherein the at least one first computing component required for integration comprises a baseline piece of software code and/or data;
  identifying at least one second computing component for inclusion into the computing instance, wherein the at least one second computing component is not required for integration of the configured computing instance with the at least one first computing system, wherein the at least one second computing component that is not required for integration comprises one or more industry parameters and one or more localization parameters specific to a geographic region and/or language;
  generating, using the identified at least one first computing component and the at least one second computing component along with at least one integration component comprising at least one user interface and/or at least one application program interface, a configuration of the computing instance and applying the configuration of the computing instance in the at least one first computing system;
  executing the configuration of the computing instance by the at least one first computing system; and
  storing the configuration of the computing instance.

9. The system according to claim 8, wherein the configuration of the computing instance includes configuration of at least one of the following: one or more software applications, one or more computing functionalities, one or more computing components, one or more computing systems, one or more contents, one or more data, one or more metadata, and any combination thereof.

10. The system according to claim 8, wherein the operations further comprise
receiving another request for configuring the computing instance for integration with at least a second computing system;
accessing the stored configuration of the computing instance;
applying the stored configuration of the computing instance in the at least second computing system; and
executing the stored configuration of the computing instance by the at least second computing system.

11. The system according to claim 8, wherein the computing instance is configured using a predetermined stored configuration template.

12. The system according to claim 8, wherein the computing instance is configured using at least one of the following: one or more best practices parameters associated with the at least one first computing system, and any combination thereof.

13. The system according to claim 8, wherein the generating further comprises configuring at least one of: the at least one first computing component, the at least one second computing component, and any combination thereof.

14. The system according to claim 8, wherein the generating further comprises configuring the computing instance using a predetermined content.

15. A computer program product comprising a non-transitory machine-readable medium storing instructions that, when executed by at least one programmable processor, cause the at least one programmable processor to perform operations comprising:
receiving a request to configure a computing instance for integration with at least one first computing system;
identifying at least one first computing component associated with the at least one first computing system required for integration of the configured computing instance with the at least one first computing system, wherein the at least one first computing component required for integration comprises a baseline piece of software code and/or data;
identifying at least one second computing component for inclusion into the computing instance, wherein the at least one second computing component is not required for integration of the configured computing instance with the at least one first computing system, wherein the at least one second computing component that is not required for integration comprises one or more industry parameters and one or more localization parameters specific to a geographic region and/or language;
generating, using the identified at least one first computing component and the at least one second computing component along with at least one integration component comprising at least one user interface and/or at least one application program interface, a configuration of the computing instance and applying the configuration of the computing instance in the at least one first computing system;
executing the configuration of the computing instance by the at least one first computing system; and
storing the configuration of the computing instance.

16. The computer program product according to claim 15, wherein the configuration of the computing instance includes configuration of at least one of the following: one or more software applications, one or more computing functionalities, one or more computing components, one or more computing systems, one or more contents, one or more data, one or more metadata, and any combination thereof.

17. The computer program product according to claim 15, wherein the operations further comprise
receiving another request for configuring the computing instance for integration with at least a second computing system;
accessing the stored configuration of the computing instance;
applying the stored configuration of the computing instance in the at least second computing system; and
executing the stored configuration of the computing instance by the at least second computing system.

18. The computer program product according to claim 15, wherein the computing instance is configured using a predetermined stored configuration template.

19. The computer program product according to claim 15, wherein the computing instance is configured using at least one of the following: one or more best practices parameters associated with the at least one first computing system, and any combination thereof.

20. The computer program product according to claim 15, wherein the generating further comprises configuring at least one of: the at least one first computing component, the at least one second computing component, and any combination thereof;
wherein the generating further comprises configuring the computing instance using a predetermined content.

* * * * *